(12) United States Patent
Yuan et al.

(10) Patent No.: US 10,647,073 B2
(45) Date of Patent: May 12, 2020

(54) METHOD AND APPARATUS FOR ASSEMBLING MULTILAYER MICROLENS ARRAY ELEMENTS

(71) Applicants: SEMICONDUCTOR MANUFACTURING INTERNATIONAL (SHANGHAI) CORPORATION, Shanghai (CN); SEMICONDUCTOR MANUFACTURING INTERNATIONAL (BEIJING) CORPORATION, Beijing (CN)

(72) Inventors: Xiaofeng Yuan, Shanghai (CN); Qiang Wu, Shanghai (CN)

(73) Assignees: SEMICONDUCTOR MANUFACTURING INTERNATIONAL (SHANGHAI) CORPORATION, Shanghai (CN); SEMICONDUCTOR MANUFACTURING INTERNATIONAL (BEIJING) CORPORATION, Beijing (CN)

( * ) Notice: Subject to any disclaimer, the term of this patent is extended or adjusted under 35 U.S.C. 154(b) by 10 days.

(21) Appl. No.: 15/659,377

(22) Filed: Jul. 25, 2017

(65) Prior Publication Data
US 2018/0079159 A1 Mar. 22, 2018

(30) Foreign Application Priority Data

Sep. 18, 2016 (CN) .......................... 2016 1 0826715

(51) Int. Cl.
*B29D 11/00* (2006.01)
*G02B 27/62* (2006.01)
(Continued)

(52) U.S. Cl.
CPC ........ *B29D 11/00365* (2013.01); *G02B 1/041* (2013.01); *G02B 3/0012* (2013.01);
(Continued)

(58) Field of Classification Search
CPC .............. B29D 11/00365; G02B 1/041; G02B 3/0006; G02B 3/0012; G02B 3/0056;
(Continued)

(56) References Cited

U.S. PATENT DOCUMENTS 6,875,384 B1 * 4/2005 Whitney ................. B29C 45/80
264/40.5
2007/0126010 A1 * 6/2007 Chua ................. H01L 31/02327
257/79

(Continued)

FOREIGN PATENT DOCUMENTS

CN 1173817 11/2004
CN 1567088 1/2005
(Continued)

OTHER PUBLICATIONS

European Patent Application No. 17191244.7, Partial European Search Report dated Mar. 2, 2018, 14 pages.
(Continued)

*Primary Examiner* — George R Koch
(74) *Attorney, Agent, or Firm* — Kilpatrick Townsend & Stockton LLP

(57) ABSTRACT

A method for assembling a microlens array assembly including a set of microlens array elements having at least two array elements having a first array element and a second array element includes adsorbing the first array element using a mobile platform, adsorbing the second array element using a fixture platform, coarsely aligning the second array element with the first array element based on edges of the second array element and edges of the first array element,
(Continued)

finely aligning the second array element with the first array element based on an array pattern of the second array element and an array pattern of the first array element, and attaching the second array element to the first array element. The method enables assembling of multiple microlens array elements.

20 Claims, 6 Drawing Sheets

(51) Int. Cl.
*G02B 3/00* (2006.01)
*G02B 7/02* (2006.01)
*G02B 7/00* (2006.01)
*G02B 1/04* (2006.01)
*G02B 6/42* (2006.01)
*G02B 13/00* (2006.01)
*G02B 17/08* (2006.01)
*G02B 27/32* (2006.01)

(52) U.S. Cl.
CPC ......... *G02B 3/0056* (2013.01); *G02B 3/0062* (2013.01); *G02B 6/4203* (2013.01); *G02B 7/004* (2013.01); *G02B 7/025* (2013.01); *G02B 13/0085* (2013.01); *G02B 17/08* (2013.01); *G02B 27/62* (2013.01); *G02B 27/32* (2013.01)

(58) Field of Classification Search
CPC .. G02B 3/0062; G02B 3/0068; G02B 3/0075; G02B 5/1885; G02B 6/4203; G02B 13/0085; G02B 17/08
See application file for complete search history.

(56) References Cited

U.S. PATENT DOCUMENTS

| | | | |
|---|---|---|---|
| 2007/0248892 | A1* | 10/2007 | Rangelow .............. G01C 60/16 430/5 |
| 2014/0329341 | A1* | 11/2014 | Furutani .......... H01L 21/67092 438/14 |
| 2017/0261650 | A1* | 9/2017 | Powell ................. G02B 3/0062 |

FOREIGN PATENT DOCUMENTS

| | | |
|---|---|---|
| CN | 101867158 | 10/2010 |
| CN | 103718066 | 4/2014 |
| EP | 1022108 | 7/2000 |
| EP | 1788631 | 5/2007 |

OTHER PUBLICATIONS

Chinese Application No. 201610826715.1, Office Action dated Sep. 24, 2019, 8 pages.

* cited by examiner

METHOD AND APPARATUS FOR ASSEMBLING MULTILAYER MICROLENS ARRAY ELEMENTS

CROSS-REFERENCES TO RELATED APPLICATIONS

The present application claims priority to Chinese patent application No. 201610826715.1, filed on Sep. 18, 2016, the content of which is incorporated herein by reference in its entirety.

BACKGROUND OF THE INVENTION

The present disclosure relates to semiconductor technology. More particularly, embodiments of the present disclosure relate to methods and systems for assembling microlens array assemblies.

When using a normal lens to detect wafer defects, it takes a long time to detect wafer defects due to limitations of the field of view of the normal lens. Therefore, instead of a normal lens a microlens array optical system has been recently proposed for scanning wafer defects. As the lens size becomes smaller, lens aberrations are also reduced proportionally, so that the microlens array optical system has a larger field of view, thereby improving the detection speed of wafer defects.

However, the size of a lens element in the microlens array is very small, for example, the lens element has a diameter of 10 microns and a thickness of less than 5 microns, stacking assembly of multilayer microlens arrays represents a big challenge.

BRIEF SUMMARY OF THE INVENTION

In accordance with the present disclosure, a method for assembling a microlens array assembly comprising at least two array elements including a first array element and a second array element may include adsorbing the first array element using a mobile platform, adsorbing the second array element using a fixture platform, coarsely aligning the second array element with the first array element based on edges of the second array element and edges of the first array element, finely aligning the second array element with the first array element based on an array pattern of the second array element and an array pattern of the first array element, and attaching the second array element to the first array element.

In one embodiment, coarsely aligning the second array element with the first array element includes driving the mobile platform using a knob of a base platform that supports the mobile platform. In one embodiment, finely aligning the second array element with the first array element includes driving the mobile platform using one or more piezoelectric ceramics.

In one embodiment, the method may further include dispensing an adhesive on the first array element using a dispenser of the fixture platform, and attaching the second array element to the first array element includes using the dispended adhesive on the first array element.

In one embodiment, the at least two array elements further includes a third array element, and the method further includes dispensing an adhesive on the second array element using a dispenser of the fixture platform, adsorbing the third array element using the fixture platform, coarsely aligning the third array element with the second array element based on edges of the third array element and the edges of the second array element, finely aligning the third array element with the second array element based on an array pattern of the third array element and the array pattern of the second array element, and attaching the third array element to the second array element.

Embodiments of the present disclosure also provide a system for assembling a microlens array assembly comprising at least two array elements including a first array element and a second array element. The system may include a mobile platform configured to adsorb the first array element, a fixture platform configured to adsorb the second array element, align the second array element with the first array element, and attach the second array element to the first array element, a first microscope system configured to observe edges of the second array element and the first array element, and a second microscope system configured to observe an array pattern of the second array element and the first array element. The second array element is coarsely aligned with the first array element based on the observed edges using the first microscope system, and the second array element is finely aligned with the first array element based on the observed array pattern using the second microscope system.

In one embodiment, the system may further include a base platform configured to support the mobile platform and drive the mobile platform by means of a knob to coarsely align the second array element with the first array element. In one embodiment, the system may further include one or more piezoelectric ceramics configured to drive the mobile platform to finely align the second array element with the first array element.

In one embodiment, the fixture platform includes a dispenser configured to dispense an adhesive on the first array element; and the fixture platform attaches the second array element to the first array element using the dispensed adhesive.

In one embodiment, the at least two array elements further includes a third array element, and the fixture platform includes a dispenser configured to dispense an adhesive on the second array element; and the fixture platform attaches the third array element to the second array element using the dispensed adhesive. The third array element is coarsely aligned with the second array element based on observed edges using the first microscope system, and the third array element is finely aligned with the second array element based on an observed array pattern using the second microscope system.

Embodiments of the present disclosure also provide a second method for assembling a microlens array assembly comprising at least two array elements including a first array element and a second array element. The method may include adsorbing the first array element to a mobile platform using the mobile platform, absorbing a dispenser through the mobile platform, dispensing an adhesive on the first array element by the dispenser, adsorbing the second array element on the fixture platform through a transparent liquid disposed between the fixture platform and the second array element, aligning the second array element with the first array element using the fixture platform, and attaching the second array element to the first array element using the dispensed adhesive on the first array element.

In one embodiment, each of the first and second array elements includes a plurality of microlenses and a plurality of edge pillars disposed between the microlenses, and the edge pillars have a height greater than a height of the microlenses.

In one embodiment, the transparent liquid fills a space (void) between the fixture platform and the microlenses and the edge pillars of the second array element. Aligning the second array element with the first array element using the fixture platform includes adsorbing the second array element through the transparent liquid, and aligning the edge pillars of the second array element with the edge pillars of the first array element.

In one embodiment, the dispenser includes a quartz body and a plurality of quartz pillars disposed on the quartz body corresponding to the plurality of edge pillars.

In one embodiment, dispensing an adhesive on the first array element by the dispenser includes adsorbing the quartz body on the fixture platform, dipping the quarts pillars into a curing adhesive to cover a portion of the quartz pillars with the adhesive, aligning the quartz pillars with the edge pillars of the first array element, and transferring the adhesive from the quartz pillars to the edge pillars of the first array element.

In one embodiment, aligning the second array element with the first array element includes coarsely aligning the second array element to the first array element based on edges of the second array element and edges of the first array element, and finely aligning the second array element to the first array element based on an array pattern of the second array element and an array pattern of the first array element.

In one embodiment, coarsely aligning the second array element to the first array element includes adjusting the edges of the second array element in relation to the edges of the first array element through a knob of a base platform that supports the mobile platform to drive the platform. In one embodiment, finely aligning the second array element to the first array element includes adjusting the array pattern of the second array element in relation to the array pattern of the first array element by driving the mobile platform with one or more piezoelectric ceramics.

In one embodiment, the method may further include curing the adhesive on the first array element using ultraviolet light emitted from an ultraviolet light source.

In one embodiment, the method may further include driving the fixture platform using a drive mechanism connected to the fixture platform through an elastic member.

In one embodiment, the at least two array elements includes a third array element. The method further includes dispensing an adhesive on the second array element that has been attached to the first array element by the dispenser, adsorbing the third array element on the fixture platform through the transparent liquid, aligning the third array element with the second array element, and attaching the third array element to the second array element using the dispended adhesive on the second array element.

In one embodiment, the transparent liquid includes water.

Embodiments of the present disclosure also provides a system for assembling a microlens array assembly comprising at least two array elements including a first array element and a second array element. The system includes a mobile platform configured to adsorb the first array element and a fixture platform configured to dispense an adhesive to the first array element, adsorb the second array element through a transparent liquid disposed between the fixture platform and the second array element, align the second array element with the first array element, and attach the second array element to the first array element.

In one embodiment, the transparent liquid fills a space (void) between the fixture platform and the microlenses and the edge pillars of the second array element. The fixture platform is configured to adsorb the second array element through the transparent liquid and align the edge pillars of the second array element with the edge pillars of the first array element. In one embodiment, the fixture platform further includes a dispenser configured to dispense the adhesive on the first array element. In one embodiment, the dispenser includes a quartz body and a plurality of quartz pillars disposed on the quartz body corresponding to the plurality of edge pillars.

In one embodiment, the fixture platform is further configured to adsorb the quartz body and dip the quartz pillars into an adhesive to cover a portion of the quartz pillars with the adhesive, align the quartz pillars with the edge pillars of the first array element, and transfer the adhesive to the edge pillars of the first array element.

In one embodiment, the system may further include a first microscope system configured to observe edges of the second array element and the first array element, and a second microscope system configured to observe an array pattern of the second array element and the first array element. The second array element is coarsely aligned with the first array element based on the observed edges, and the second array element is finely aligned with the first array element based on the observed array pattern.

In one embodiment, the system may further include a base platform configured to support the mobile platform and drive the mobile platform by means of a knob to coarsely align the second array element with the first array element.

In one embodiment, the system may further include one or more piezoelectric ceramics configured to drive the mobile platform to finely align the second array element with the first array element.

In one embodiment, the system may further include an ultraviolet light source configured to emit ultraviolet light for curing the adhesive on the first array element.

In one embodiment, the system may further include a drive mechanism connected to the fixture platform through an elastic member and configured to drive the fixture platform.

In one embodiment, the at least two array elements further includes a third array element, and the system is further configured to dispense an adhesive on the second array element that has been attached to the first array element, adsorb the third array element to the fixture platform through the transparent liquid, align the third array element with the second array element, and attach the third array element to the second array element using the dispensed adhesive on the second array element.

The following description, together with the accompanying drawings, will provide a better understanding of the nature and advantages of the claimed disclosure.

BRIEF DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION OF THE INVENTION

Figure 1:
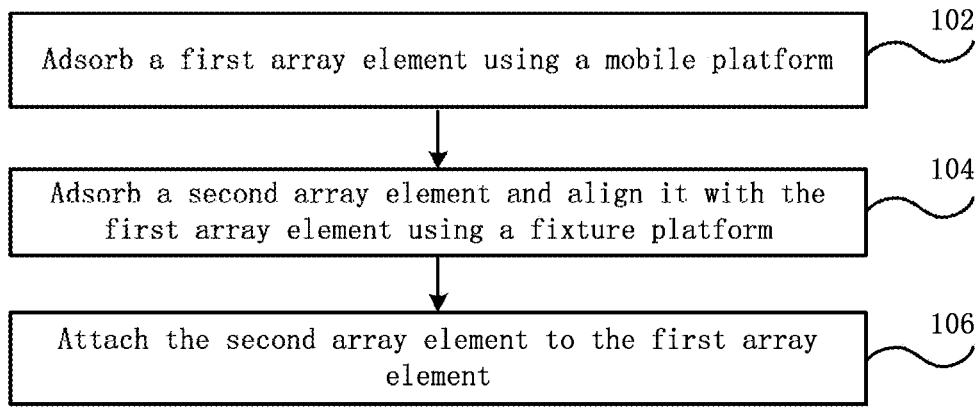
FIG. 1 is a simplified flowchart of a method for assembling a microlens array assembly according to one embodiment of the present disclosure.

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

It should be understood that the drawings are not drawn to scale, and similar reference numbers are used for representing similar elements. Embodiments of the invention are described herein with reference to cross-section illustrations that are schematic illustrations of idealized embodiments (and intermediate structures) of the invention. The thickness of layers and regions in the drawings may be exaggerated relative to each other for clarity. Additionally, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

It will be understood that, when an element or layer is referred to as "on," "disposed on," "adjacent to," "connected to," or "coupled to" another element or layer, it can be disposed directly on the other element or layer, adjacent to, connected or coupled to the other element or layer, or intervening elements or layers may also be present. In contrast, when an element is referred to as being "directly on," directly disposed on," "directly connected to," or "directly coupled to" another element or layer, there are no intervening elements or layers present between them. It will be understood that, although the terms "first," "second," "third." etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Relative terms such as "under," "below," "underneath," "over," "on," "above," "bottom," and "top" are used herein to described a relationship of one element, layer or region to another element, layer or region as illustrated in the figures. It will be understood that these terms are intended to encompass different orientations of the structure in addition to the orientation depicted in the figures. For example, if the device shown in the figures is flipped, the description of an element being "below" or "underneath" another element would then be oriented as "above" the other element. Therefore, the term "below," "under," or "underneath" can encompass both orientations of the device. Because devices or components of embodiments of the present disclosure can be positioned in a number of different orientations (e.g., rotated 90 degrees or at other orientations), the relative terms should be interpreted accordingly.

The terms "a", "an" and "the" may include singular and plural references. It will be further understood that the terms "comprising", "including", having" and variants thereof, when used in this specification, specify the presence of stated features, steps, operations, elements, and/or components, but do not preclude the presence or addition of one or more other features, steps, operations, elements, components, and/or groups thereof. Furthermore, as used herein, the words "and/or" may refer to and encompass any possible combinations of one or more of the associated listed items.

The use of the terms first, second, etc. do not denote any order, but rather the terms first, second, etc. are used to distinguish one element from another. Furthermore, the use of the terms a, an, etc. does not denote a limitation of quantity, but rather denote the presence of at least one of the referenced items.

The term "vertical" as used in this application is defined as a plane perpendicular to the conventional plane or surface of a wafer or substrate, regardless of the orientation of the wafer or substrate. The term "horizontal" refers to a direction perpendicular to the vertical as defined above.

The present disclosure will be described by way of illustrating embodiments with reference to the accompanying drawings.

FIG. 1 is a simplified flowchart of a method for assembling a microlens array assembly according to an embodiment of the present disclosure. The microlens array assembly includes a set of microlens array elements including at least two array elements. The at least two array elements may include a first array element and a second array element, each of the first and second array elements includes a plurality of microlenses. Referring to FIG. 1, the method may include the following steps:

Step 102: adsorbing (attaching, adhering, holding, picking up) the first array element using a mobile (movable) platform on the mobile platform.

The mobile platform may be, for example, a flexible rubber platform. In one embodiment, the mobile platform has a flatness (roughness) less than 1 microns in the absence of an external force.

Step 104: adsorbing a second array element using a fixture platform, and aligning the second array element with the first array element using the fixture platform.

The alignment of the second array element with the first array element includes a coarse alignment and a fine alignment. The coarse and fine alignments of the second array element with the first array element will be described in detail below.

Firstly, the second array element may be coarsely aligned with the first array element based on the edges of the second array element and the first array element. In one embodiment, the coarse alignment of the second array element with the first array element may be achieved by aligning the edges of the second array element to the edges of the first array element using a knob on a base platform, which supports the mobile platform, to drive the mobile platform. In one embodiment, the coarse alignment has an alignment accuracy of about 10 microns.

Thereafter, the second array element may be finely aligned with the first array element based on the array pattern of the second array element and the array pattern of the first array element. In one embodiment, the mobile platform may be driven by one or more piezoelectric ceramics based on the array pattern to achieve a fine alignment. In one embodiment, the array pattern may includes one or more markers configured to determine optical alignment or overlay of the first and second array elements. The fine alignment has an alignment accuracy of about 10 nm.

Step 106: aligning the second array element with the first array element.

In the embodiment, the second array element is coarsely aligned with the first array element based on the edges of the second array element and the first array element. Thereafter, the second array element is finely aligned with the first array element based on the array pattern of the second array element and the array pattern of the first array element. Through the coarse alignment and the fine alignment processes, a precise alignment of the second array element and the first array element can be obtained.

In one embodiment, prior to step 104, an adhesive may be dispensed on the first array element on the mobile platform by dispensing through an adhesive dispensing tool (dispenser) of the fixture platform. The used adhesive may be, e.g., a ultraviolet (UV) curable adhesive. Then, after the second array element is aligned with the first array element, the second array element may be attached to the first array element using the adhesive on the first array element.

Figure 2:
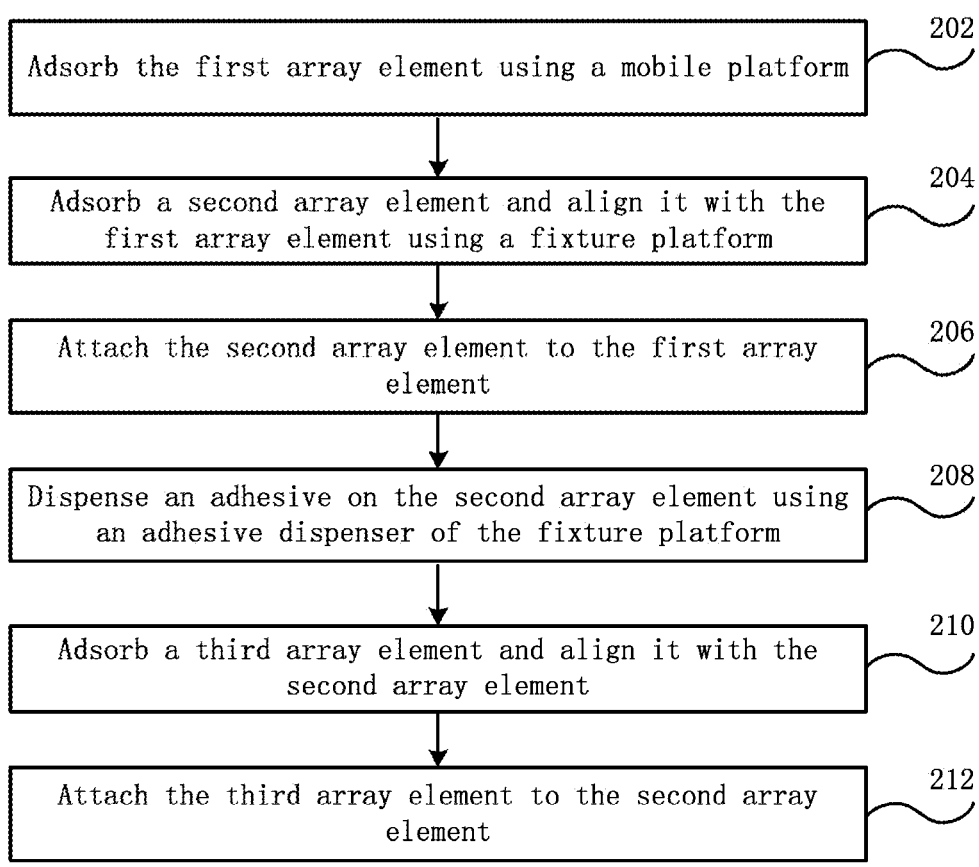
FIG. 2 is a simplified flowchart of a method for assembling a microlens array assembly according to another embodiment of the present disclosure.

FIG. 2 is a simplified flowchart of a method for assembling a microlens array assembly according to another embodiment of the present disclosure. In the embodiment, the at least two array elements may further include a third array element, and steps 202, 204, and 206 may refer to the above-described steps 102, 104, and 106, respectively. Referring to FIG. 2, the method may further include:

Step 208: dispensing an adhesive to the second array element, which is attached to the first array element, through an adhesive dispensing tool of the fixture platform.

Step 210: adsorbing the third array element using the fixture platform, and aligning the third array element with the second array element. The third array element is coarsely aligned with the second array element based on the edges of the third array element and the edges of the second array element, and finely aligning the third array element with the second array element based on the array pattern of the third array element and the array pattern of the second array element.

Step 212: attaching the third array element to the second array element.

In the embodiment, the coarse alignment is performed on the first array element, the second array element and the third array element based on the edges of the first, second, and third array elements. Thereafter, the fine alignment is performed on the first array element, the second array element, and the third array element based on the array patterns of the first, second, and third array elements. And the aligned first, second, and third array elements are then attached (assembled, bonded) together.

One of skill in the art will appreciate that more than three array elements can be assembled based on the above-described methods of present disclosure.

Figure 3:
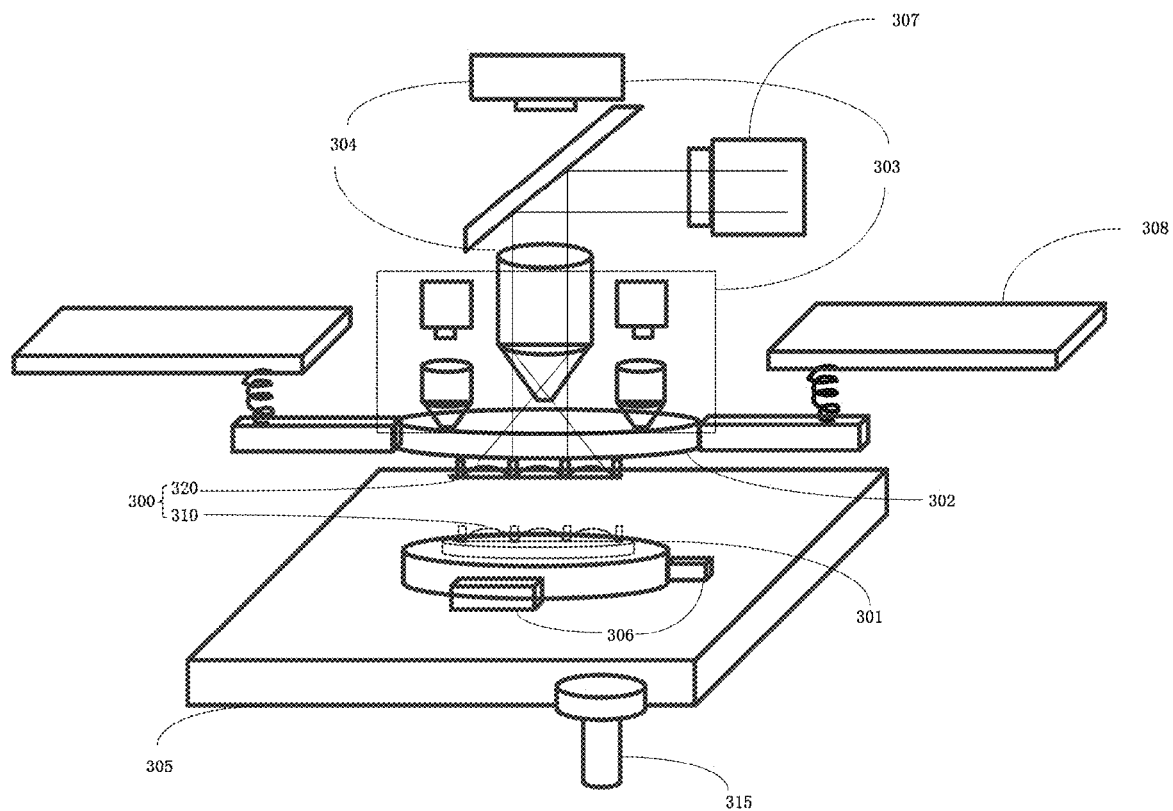
FIG. 3 is a schematic view of a system for assembling a microlens array assembly according to one embodiment of the present disclosure.

FIG. 3 is a schematic diagram of a system for assembling a microlens array assembly according to one embodiment of the present disclosure. Referring to FIG. 3, the system may include at least two array elements. The at least two array elements include a set of microlens array element 300 including a first array element 310 and a second array element 320. As shown in FIG. 3, the system may further include a mobile (movable) platform 301, a fixture platform 302, a first microscope system 303, and a second microscope system 304.

Mobile platform 301 is configured to adsorb (pick up, hold) first array element 310. Mobile platform 301 may be a flexible rubber platform. First array element 310 may include a substrate below the microlenses, and mobile platform 301 can pick up first array element 310 by adsorbing (sucking, holding) the substrate.

Fixture platform 302 is configured to adsorb (pick up, hold) second array element 320, align second array element 320 with first array element 310, and attach (bond) the aligned second array element 320 to first array element 310.

First microscope system 303 is configured to observe the edges of second array element 320 and the edges of first array element 310. First microscope system 303 may include an objective lens and an eyepiece (not shown) for viewing the edges of second array element 320 and the edges of first array element 310.

Second microscope system 304 is configured to observe the array pattern of second array element 320 and first array element 310. Second microscope system 304 may include an objective lens and an eyepiece (not shown) for viewing the array pattern of second array element 320 and the array pattern of first array element 310.

It is to be understood that, for the sake of brevity, FIG. 3 only shows a simplified structure of first microscope system 303 and second microscope system 304. One of skilled in the art will appreciate that the microscope system may include other features and variable magnification.

The above-described alignments include a coarse alignment and a fine alignment. The second array element is coarsely aligned with the first array element based on the edges of the second array element and the edges of the first array element using first microscope system 303. In addition, the second array element is finely aligned with the first array element based on the array pattern of the second array element and the array pattern of the first array element using second microscope system 304.

It is to be noted that, although the system for assembling a microlens array in FIG. 3 is shown to include a number of other components, it is understood these components are not essential in different embodiments. For example, in some embodiments, the system for assembling a microlens array may include certain components shown in FIG. 3, but not all of the components.

According to another embodiment, referring to FIG. 3, the system for assembling a microlens array may also include a base (pedestal) platform 305 that supports mobile platform 301. Pedestal platform 305 may be configured to move under the control of a knob 315 to drive mobile platform 301 to achieve a coarse alignment of second array element 320 with first array element 310.

According to yet another embodiment, referring to FIG. 3, the system for assembling a microlens array assembly may also include one or more piezoelectric ceramics 306 that are configured to drive mobile platform 301 to achieve a fine alignment of second array element 320 with first array element 310.

According to still another embodiment, referring to FIG. 3, fixture platform 302 may also be configured to dispense an adhesive to first array element 310 on mobile platform 301 and attach second array element 320 to first array element 310 using the adhesive after second array element 320 has been aligned with first array element 310.

The above-described system for assembling a microlens array assembly may be applied to assemble several array elements. In one embodiment, the at least two array elements may further include a third array element. In this case, fixture platform 302 may be configured to adsorb the adhesive dispenser and uses the dispenser to dispense an adhesive on the second array element that is attached to the first array element. After dispensing the adhesive on the second array element, fixture platform 302 adsorbs the third array element, aligns the third array element with the second array element, and attaches the third array element to the second array element using the adhesive on the second array element. Similar to the alignment processes of the first array element and the second array element, the third array element may be coarsely aligned with the second array element based on the edges of the third array element and the second array element, then the third array element may be finely aligned with the second array element based on the array pattern of the third array element and the array pattern of the second array element.

Figure 4:
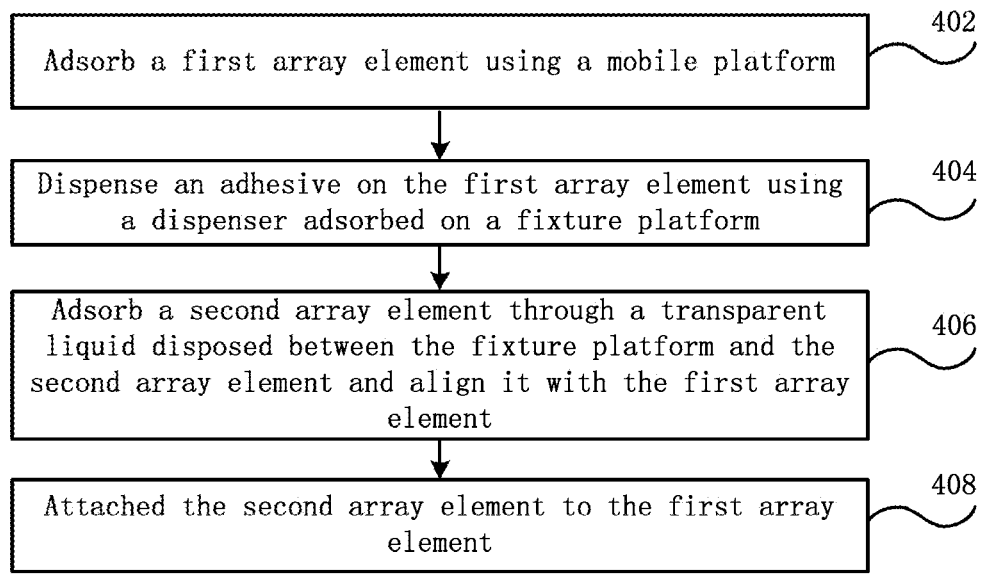
FIG. 4 is a simplified flowchart of a method for assembling a microlens array assembly according to yet another embodiment of the present disclosure.

FIG. 4 is a simplified flowchart of a method for assembling a microlens array assembly according to an embodiment of the present disclosure. The microlens array assembly includes a set of microlens array elements including at least two array elements. The at least two array elements include a first array element and a second array element, each of the first and second array elements includes a plurality of microlenses. Referring to FIG. 4, the method may include the following steps:

Step 402: adsorbing the first array element using the mobile platform.

For example, the first array element may be adsorbed on the mobile platform using vacuum adsorption. Alternatively, the first array element may be adsorbed on the mobile platform using a transparent liquid (e.g., water) disposed between the mobile platform and the first array element.

Step 404: adsorbing the adhesive dispenser using the fixture platform and dispensing adhesive to the first array element on the mobile platform using the dispenser. The fixture platform then releases the dispenser.

In a preferred embodiment, the fixture platform includes quartz.

Step 406: adsorbing the second array element through the transparent liquid disposed between the fixture platform and the second array element, and aligning the second array element with the first array element.

As disclosed herein, the transparent liquid may include, but is not limited to, water. In one embodiment, the second array element may be coarsely aligned with the first array element based on the edges of the second array element and the first array element. In an exemplary embodiment, the coarse alignment of the second array element with the first array element based on the edges of the second array element and the edges of the first array element can be achieved using a knob on the base platform to drive the mobile platform. In addition, the second array element may be finely aligned with the first array element based on the array pattern of the second array element and the array pattern of the first array element. In an exemplary embodiment, the fine alignment of the second array element with the first array element based on the array pattern of the second array element and the array pattern of the first array element can be achieved using one or more piezoelectric ceramics to drive the mobile platform.

Step 408: attaching the aligned second array element with the first array element.

In a preferred embodiment, prior to step 408, the adhesive on the first array element can be cured using ultraviolet (UV) light emitted from a UV light source.

In the embodiment, the second array element may be adsorbed through the transparent liquid disposed between the fixture platform and the second array element to the fixture platform. Comparing to the vacuum adsorption approach, the fixture platform in the transparent liquid approach does not require perforation, thereby facilitating the observation in the alignment of the second array element with the first array element and curing of the adhesive on the first array element using UV light emitted from a UV light source.

In steps 404 to 408, the fixture platform can be moved using a drive mechanism connected to the fixture platform through an elastic member, thereby enabling the adhesive dispensing operation on the first array element, the alignment operation of the second array element with the first array element, and the attachment operation of the second array element to the first array element. Thus, when the second array element is in contact with and bonded (attached) to the first array element, the elastic member can absorb excess pressure to prevent damage to the array elements caused by the excessive pressure.

The example below describes the approach of using the fixture platform to adsorb the second array element and using the transparent liquid disposed between the fixture platform and the second array element.

Figure 5:
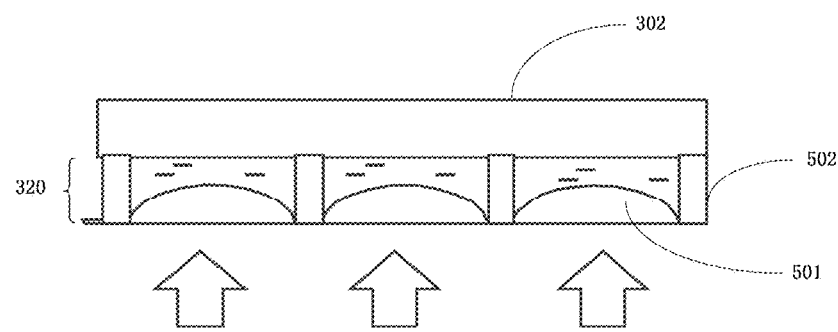
FIG. 5 is a sectional view illustrating a transparent liquid disposed between a fixture platform and the second array element used to adsorb the second array element to the fixture platform.

FIG. 5 is a schematic sectional view of an example illustrating the adsorption of the second array element through a transparent liquid disposed between the fixture platform and the second array element. As shown in FIG. 5, each array element includes a plurality of microlenses 501 and a plurality of edge pillars 502 disposed between microlenses 501. Edge pillars 502 each have a height that is greater than the height of microlenses 501. In one embodiment, microlenses 501 are plano-convex lenses (i.e., one side has a convex surface, and an opposite side has a planar surface). The space (void) formed between fixture platform 302, microlenses 501 of the second array element 320, and edge pillars 502 is filled with a transparent liquid, e.g., water. Since the space is filled with a transparent liquid, no air bubbles are present, so that second array element 320 is tightly attached to fixture platform 302 under atmospheric pressure. In this way, the second array element is attached to the fixture platform through the transparent liquid that fills the space between the fixture platform and the second array element, and the edge pillars of the second array element can be aligned with the edge pillars of the first array element. Further, the space between microlenses 501 of the second array element 320 and edge pillars 502 is filled with a transparent liquid, so that microlenses 501 will not be damaged under atmospheric pressure.

A specific implementation of an adhesive dispenser is described in detail below.

Figure 6:
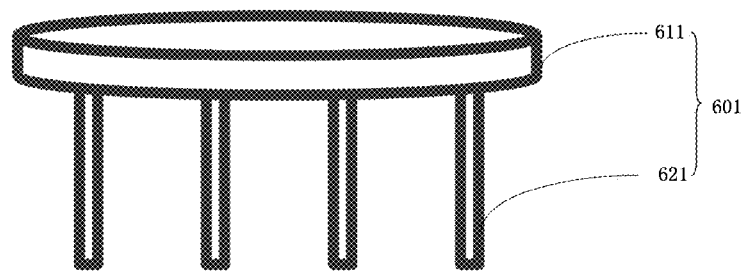
FIG. 6 is a view of an adhesive dispenser according to one embodiment of the present disclosure.

FIG. 6 is a perspective view of an adhesive dispenser 601 according to an embodiment of the present disclosure. As shown in FIG. 6, dispenser 601 may include a quartz body 611 and a plurality of quartz pillars 621 below quartz body 611 corresponding to the plurality of edge pillars 502. In other words, the dispenser may be designed according to the microlens array elements. For example, the quartz pillars of the dispenser can be designed according to the number and size of the edge pillars of the array elements, so that the corresponding position (non-microlens area) of the array element can be dispensed with the dispenser to avoid contamination of the microlenses. In one embodiment, the dispenser shown in FIG. 6 can be obtained through performing an etching process on a quartz substrate. In a non-limiting embodiment, each of the quartz pillars has a height of 100 microns and a diameter of 3 microns.

FIGS. 7A to 7F are perspective views of various stages for assembling a microlens array assembly according to one embodiment of the present disclosure. A method for assembling a microlens array assembly will be described in detail below with reference to the dispenser in FIG. 6 and FIGS. 7A through 7F.

Figure 7A:
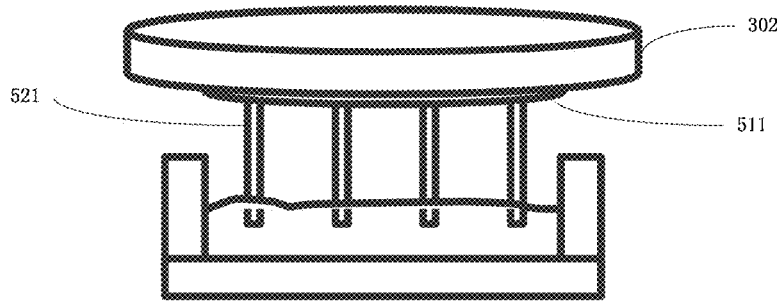
FIG. 7A is a schematic view of an intermediate stage of a method for assembling a microlens array assembly according to one embodiment of the present disclosure.
Figure 7B:
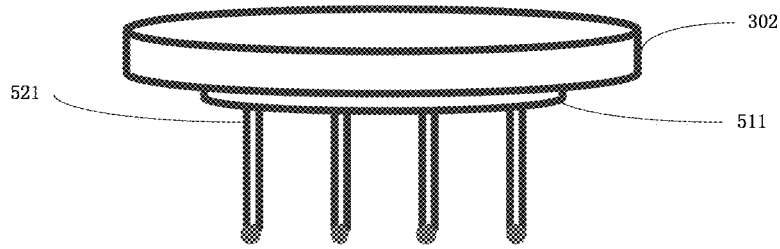
FIG. 7B is a perspective view of an intermediate stage of a method for assembling a microlens array assembly according to one embodiment of the present disclosure.

Referring to FIGS. 7A and 7B, fixture platform 302 adsorbs quartz body 511 and dips a portion (the distal end, tips) of quartz pillars 521 into a curable adhesive. The curable adhesive may be, e.g., a UV-curable adhesive.

Figure 7C:
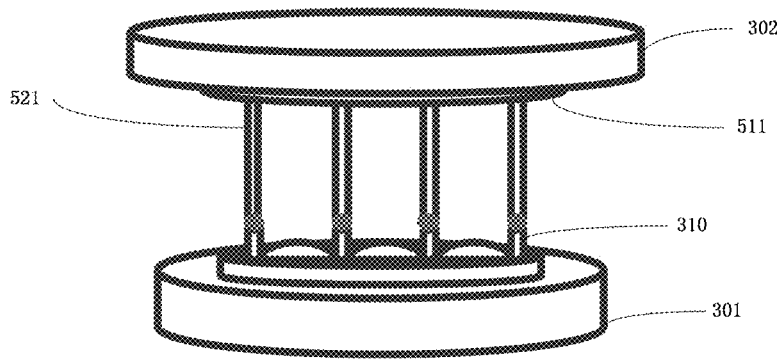
FIG. 7C is a perspective view of an intermediate stage of a method for assembling a microlens array assembly according to one embodiment of the present disclosure.
Figure 7D:
FIG. 7D is a perspective view of an intermediate stage of a method for assembling a microlens array assembly according to one embodiment of the present disclosure.

Referring to FIGS. 7C and 7D, quartz pillars 521 with the tips (distal end) containing the adhesive are aligned with a plurality of edge pillars of first array element 301 and transfer the adhesive to the edge pillars of the first array element.

Figure 7E:
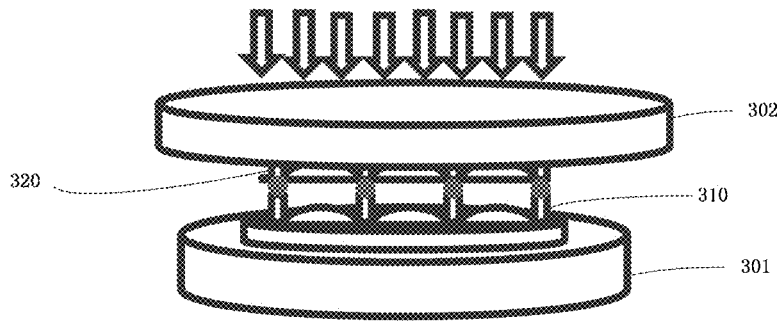
FIG. 7E is a perspective view of an intermediate stage of a method for assembling a microlens array assembly according to one embodiment of the present disclosure.

Referring to FIG. 7E, fixture platform 302 adsorbs second array element 320 and aligns the edge pillars of second array element 320 with the edge pillars of first array element 310, and the adhesive on the edge pillars of first array element 310 is cured using the ultraviolet light emitted by a ultraviolet light source.

Figure 7F:
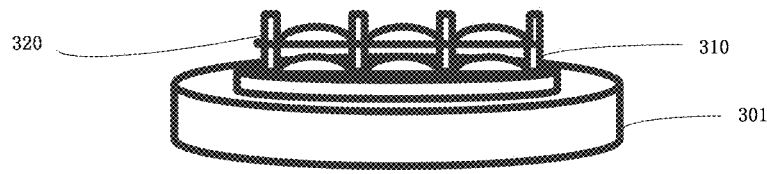
FIG. 7F is a perspective view of an intermediate stage of a method for assembling a microlens array assembly according to one embodiment of the present disclosure.

Referring to FIG. 7F, fixture platform 302 releases second array element 320 and attaches (bonds) second array element 320 to first array element 310.

Figure 8:
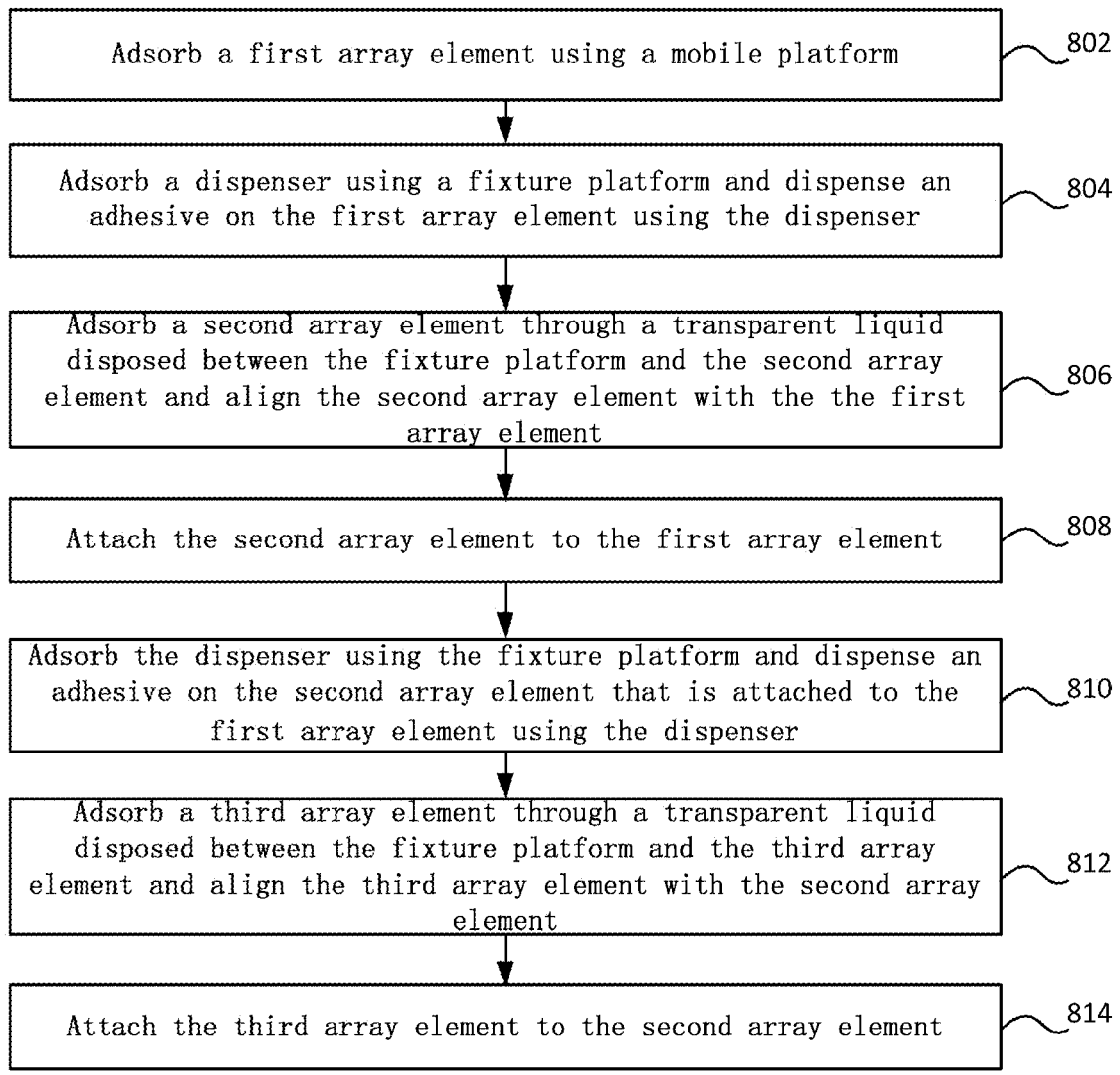
FIG. 8 is a simplified flowchart of a method for assembling a microlens array assembly according to still another embodiment of the present disclosure.

FIG. 8 is a simplified flowchart of a method for assembling a microlens array assembly in accordance with yet another embodiment of the present disclosure. In the embodiment, the at least two array elements further includes include a third array element. The description of steps 802 to 808 may refer to the above-described steps 402 to 408 of FIG. 4 and will not be repeated herein for the sake of brevity. Referring to FIG. 8, the method may also include:

Step 810: dipping a distal end of the quartz pillars into a curable adhesive using the dispenser, dispensing the adhesive to the second array element that has been attached to the first array element. The dispenser is then released from the fixture platform.

Step 812: adsorbing the third array element using the transparent liquid disposed between the fixture platform and the third array element, and aligning the third array element with the second array element.

Step 814: attaching (bonding) the third array element to the second array element.

Similarly, in a preferred embodiment, prior to performing step 814, the adhesive on the second array element can be cured using ultraviolet light emitted from an ultraviolet light source.

In the embodiment, the third array element may be adsorbed to the fixture platform through the transparent liquid disposed between the fixture platform and the third array element. Comparing to the vacuum adsorption approach, the fixture platform in the transparent liquid approach does not require perforation, thereby facilitating the observation in the alignment of the third array element with the second array element and curing of the adhesive on the second array element using UV light emitted from a UV light source.

The present disclosure also provides another system for assembling microlens array assemblies corresponding to the methods shown in FIG. 4 and FIG. 8. In one embodiment, the system for assembling microlens array assemblies includes at least two array elements including the first array element and the second array element. Referring to FIG. 3, the system may include a mobile platform 301 and a fixture platform 302. Mobile platform 301 is configured to adsorb first array element 310. Fixture platform 302 is configured to adsorb the dispenser to dispense an adhesive on first array element 310 on mobile platform 301. Second array element 320 is adsorbed by the transparent liquid disposed between the fixture platform and the second array element and aligned with first array element 310. Fixture platform 302 is further configured to attach (bond) second array element 320 to first array element 310 after aligning the second array element with the first array element. The transparent liquid may include, but is not limited to, water.

In the embodiment, the fixture platform may adsorb the second array element through the transparent liquid disposed between the fixture platform and the second array element. In this way, comparing to the vacuum adsorption approach, the fixture platform in the transparent liquid approach does not require perforation, thereby facilitating the observation in the alignment of the second array element with the first array element and the curing of the adhesive on the second array element using UV light emitted from a UV light source.

In practice, the above-described system may also be used to achieve the assembly of many more array elements. In one embodiment, the at least two array elements may include a third array element. In this case, fixture platform 302 may also be configured to dispense an adhesive on the second array element that is attached to the first array element. The third array element is adsorbed to fixture platform 302 through the transparent liquid disposed between fixture platform 302 and the third array element. Fixture platform 302 may also be configured to align the third array element with the second array element, attach the third array element to the second array element using the adhesive on the second array element, thereby enabling the assembly of three array elements.

According to another embodiment of the present disclosure, each array element may include a plurality of microlenses and a plurality of edge pillars disposed between the microlenses. The height of the edge pillars is greater than the height of the microlenses. The space (air gap, void) between the fixture platform and the microlenses and edge pillars of the second array element is filled with a transparent liquid. In this case, the fixture platform can adsorb the second array element through the transparent liquid filled in the space between the fixture platform and the microlenses and edge pillars of the second array element, and aligns the edge pillars of the second array element with the edge pillars of the first array element.

According to yet another embodiment of the present disclosure, the system for assembling a microlens array assembly may also include a dispenser 601 (shown in FIG. 6) configured to dispense an adhesive to first array element 310 on mobile platform 301. In a specific embodiment, dispenser 601 may include a quartz body 611 and a plurality of quartz pillars 621 disposed below quartz body 611 and corresponding to the plurality of edge pillars of the array element. Accordingly, fixture platform 302 can adsorb quartz body 611, dip the plurality of quartz pillars 621 into the curing adhesive, align quartz pillars 621 with the edge pillars of first array element 310, and transfer the cured adhesive from quartz pillars 621 to the edge pillars of first array element 310.

According to still another embodiment of the present disclosure, referring to FIG. 3, the system for assembling a microlens array assembly may also include a first microscope system 303 and a second microscope system 304. First microscope system 303 is configured to observe the edges of the second array element and the first array element. Second microscope system 303 is configured to observe the array pattern of the second array element and the first array element. Thus, second array element 320 may be aligned with first array element 310 based on the edges of second array element 320 and the edges of first array element 310 that are observed using first microscope system 303 in a coarse alignment. Second array element 320 may be aligned with first array element 310 based on the array pattern of second array element 320 and the array pattern of first array element 310 that are observed using second microscope system 304 in a fine alignment.

Referring to FIG. 3, in order to achieve the coarse alignment of the second array element with the first array element, the system for assembling a microlens array assembly may also include a base platform 305 that supports the mobile platform. Base platform 305 is configured to drive mobile platform 301 under adjustment of knob 315 to enable the coarse alignment of second array element 320 with first array element 310.

Referring still to FIG. 3, in order to achieve the fine alignment of the second array element with the first array element, the system for assembling a microlens array assembly may also include one or more piezoelectric ceramics 306 that are configured to drive mobile platform 301.

Figure 9:
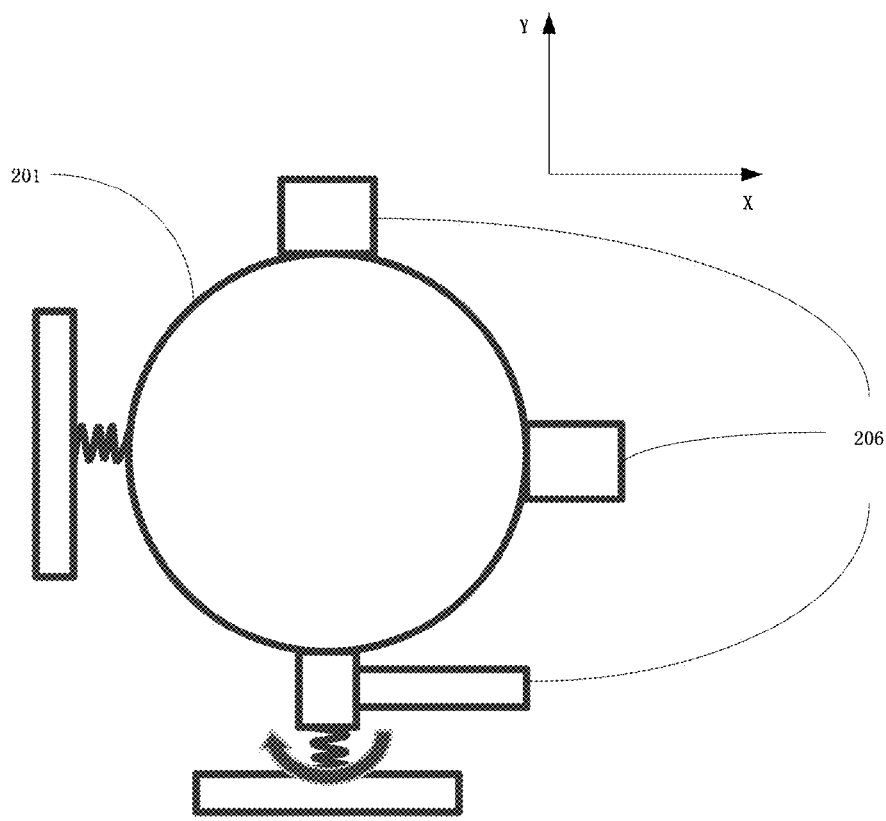
FIG. 9 is a top view of piezoelectric ceramics configured to drive a mobile platform according to one embodiment of the present disclosure.

FIG. 9 is a top view of a mobile platform driven by one or more piezoelectric ceramics according to one embodiment of the present disclosure. As shown in FIG. 9, mobile platform 201 may be moved horizontally in the X and Y directions and rotationally around the center under the control of three piezoelectric ceramics 206. In one exemplary embodiment, the accuracy of the coarse alignment can be 10 microns. The accuracy of the alignment of second array element 320 with first array element 310 is 10 nm using piezoelectric ceramics 206.

According to yet another embodiment of the present disclosure, referring still to FIG. 3, the system for assembling a microlens array assembly may also include an ultraviolet light source 307 and a drive mechanism 308. Ultraviolet light source 307 is configured to emit ultraviolet light to cure the adhesive disposed on first array element 310. Further, ultraviolet light source 307 may also be configured to serve as a photo light source for first microscope system 303 and second microscope system 304. Drive mechanism 308 is connected to fixture platform 302 through an elastic member for driving the fixture platform.

The terms "array element" and "microlens array element" are used interchangeably. The terms "dispenser" and "adhesive dispenser" are used interchangeably. The terms "attaching", "holding" and "adsorbing" are used interchangeably.

References in the specification to "one embodiment", "an embodiment", an "example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. The terms "forming" and "depositing" are used interchangeably.

While the present disclosure is described herein with reference to illustrative embodiments, this description is not intended to be construed in a limiting sense. Rather, the purpose of the illustrative embodiments is to make the spirit of the present disclosure be better understood by those skilled in the art. In order not to obscure the scope of the disclosure, many details of well-known processes and manufacturing techniques are omitted. Various modifications of the illustrative embodiments as well as other embodiments will be apparent to those of skill in the art upon reference to the description. It is therefore intended that the appended claims encompass any such modifications.

Furthermore, some of the features of the preferred embodiments of the present disclosure could be used to advantage without the corresponding use of other features. As such, the foregoing description should be considered as merely illustrative of the principles of the disclosure, and not in limitation thereof.

What is claimed is:

1. A method for assembling a microlens array assembly comprising at least two array elements including a first array element and a second array element, the method comprising:
   adsorbing the first array element having a plurality of first microlenses using a mobile platform;
   adsorbing the second array element having a plurality of second microlenses using a fixture platform;
   coarsely aligning the second array element with the first array element based on edge pillars of the second array element and edge pillars of the first array element;
   finely aligning the second array element with the first array element based on an array pattern of the second array element and an array pattern of the first array element; and
   attaching the second array element to the first array element.

2. The method of claim 1, wherein coarsely aligning the second array element with the first array element comprises:
   driving the mobile platform using a knob of a base platform that supports the mobile platform.

3. The method of claim 1, wherein finely aligning the second array element with the first array element comprises:
   driving the mobile platform using one or more piezoelectric ceramics.

4. The method of claim 1, further comprising:
   dispensing an adhesive on the edge pillars of the first array element using a dispenser of the fixture platform; and attaching the second array element to the first array element comprises using the dispended adhesive on the edge pillars of the first array element.

5. The method of claim 4, wherein the adhesive is a ultraviolet curable adhesive.

6. The method of claim 1, wherein the at least two array elements further comprises a third array element, the method further comprising:
dispensing an adhesive on the second array element using a dispenser of the fixture platform;
adsorbing the third array element using the fixture platform;
coarsely aligning the third array element with the second array element based on edge pillars of the third array element and the edge pillars of the second array element;
finely aligning the third array element with the second array element based on an array pattern of the third array element and the array pattern of the second array element; and
attaching the third array element to the second array element.

7. The method of claim 1, wherein the mobile platform comprises a flexible rubber platform.

8. The method of claim 1, wherein the first array element comprises a substrate disposed below the plurality of first microlenses, and adsorbing the first array element comprises adsorbing the substrate.

9. A method for assembling a microlens array assembly comprising at least two array elements including a first array element and a second array element, the method comprising:
adsorbing the first array element to a mobile platform using the mobile platform;
absorbing a dispenser through the mobile platform;
dispensing an adhesive on the first array element by the dispenser;
adsorbing the second array element on a fixture platform through a transparent liquid disposed between the fixture platform and the second array element;
aligning the second array element with the first array element using the fixture platform; and
attaching the second array element to the first array element using the dispensed adhesive on the first array element.

10. The method of claim 9, wherein the first and second array elements each comprise a plurality of microlenses and a plurality of edge pillars disposed between the microlenses, the edge pillars having a height greater than a height of the microlenses.

11. The method of claim 10, wherein the transparent liquid fills a space between the fixture platform and the microlenses and the edge pillars of the second array element, and aligning the second array element with the first array element using the fixture platform comprises:
adsorbing the second array element through the transparent liquid; and
aligning the edge pillars of the second array element with the edge pillars of the first array element.

12. The method of claim 10, wherein the dispenser comprises a quartz body and a plurality of quartz pillars disposed on the quartz body corresponding to the plurality of edge pillars.

13. The method of claim 12, wherein dispensing an adhesive on the first array element by the dispenser comprises:
adsorbing the quartz body on the fixture platform;
dipping the quarts pillars into a curing adhesive to cover a portion of the quartz pillars with the adhesive;
aligning the quartz pillars with the edge pillars of the first array element;
transferring the adhesive from the quartz pillars to the edge pillars of the first array element.

14. The method of claim 9, wherein aligning the second array element with the first array element comprises:
coarsely aligning the second array element to the first array element based on edges of the second array element and edges of the first array element; and
finely aligning the second array element to the first array element based on an array pattern of the second array element and an array pattern of the first array element.

15. The method of claim 14, wherein coarsely aligning the second array element to the first array element comprises:
adjusting the edges of the second array element in relation to the edges of the first array element through a knob of a base platform that supports the mobile platform to drive the mobile platform.

16. The method of claim 14, wherein finely aligning the second array element to the first array element comprises:
adjusting the array pattern of the second array element in relation to the array pattern of the first array element by driving the mobile platform with one or more piezoelectric ceramics.

17. The method of claim 9, further comprising:
curing the adhesive on the first array element using ultraviolet light emitted from an ultraviolet light source.

18. The method of claim 9, further comprising:
driving the fixture platform using a drive mechanism connected to the fixture platform through an elastic member.

19. The method of claim 9, wherein the at least two array elements comprises a third array element, the method further comprising:
dispensing an adhesive on the second array element that has been attached to the first array element by the dispenser;
adsorbing the third array element on the fixture platform through the transparent liquid;
aligning the third array element with the second array element; and
attaching the third array element to the second array element using the dispended adhesive on the second array element.

20. The method of claim 9, wherein the transparent liquid comprises water.

* * * * *